United States Patent
Lin

(10) Patent No.: US 11,716,013 B2
(45) Date of Patent: Aug. 1, 2023

(54) ACTIVE INRUSH CURRENT LIMITATION AND HOLD-UP TIME EXTENSION CIRCUIT

(71) Applicant: Cisco Technology, Inc., San Jose, CA (US)

(72) Inventor: Chien Heng Lin, Taipei (TW)

(73) Assignee: CISCO TECHNOLOGY, INC., San Jose, CA (US)

( * ) Notice: Subject to any disclaimer, the term of this patent is extended or adjusted under 35 U.S.C. 154(b) by 370 days.

(21) Appl. No.: 17/125,023

(22) Filed: Dec. 17, 2020

(65) Prior Publication Data

US 2022/0200437 A1  Jun. 23, 2022

(51) Int. Cl.
*H02M 1/32* (2007.01)
*H02M 3/158* (2006.01)

(52) U.S. Cl.
CPC ........... *H02M 1/32* (2013.01); *H02M 3/1582* (2013.01)

(58) Field of Classification Search
CPC ............................. H02M 1/32; H02M 3/1582
See application file for complete search history.

(56) References Cited

U.S. PATENT DOCUMENTS

| | | | |
|---|---|---|---|
| 6,504,497 B2 | 1/2003 | Jang et al. | |
| 10,224,802 B1* | 3/2019 | Chakkirala | ......... H02M 3/3376 |
| 10,833,587 B1* | 11/2020 | Chen | ...................... H02M 3/158 |
| 2005/0030772 A1 | 2/2005 | Phadke | |
| 2013/0051101 A1 | 2/2013 | Cao et al. | |
| 2014/0009134 A1* | 1/2014 | Bernardon | ............ H02M 3/156 |
| | | | 323/284 |
| 2016/0268918 A1* | 9/2016 | Wang | ....................... H02M 7/04 |
| 2016/0344292 A1 | 11/2016 | Sonnaillon | |
| 2017/0047845 A1 | 2/2017 | Parakulam et al. | |
| 2017/0329380 A1 | 11/2017 | Hung et al. | |
| 2019/0190370 A1* | 6/2019 | Martin | ....................... G05F 1/70 |

OTHER PUBLICATIONS

Yu Tang et al., "Active Buck-Boost Inverter", IEEE Transactions on Industrial Electronics, vol. 61, No. 9, Sep. 2014, 7 pages.
Texas Instruments, "UCC2752x Dual 5-A High-Speed, Low-Side Gate Driver", SLUSAQ3G, Nov. 2011—Revised Apr. 2015, 44 pages.
Texas Instruments, "UCC27517A Single-Channel High-Speed Low-Side Gate Driverwith Negative Input Voltage Capability (with 4-A Peak Source and Sink)", SLUSBQ0C, Aug. 2013—Revised Aug. 2015, 32 pages.

* cited by examiner

*Primary Examiner* — Rafael O De Leon Domenech
(74) *Attorney, Agent, or Firm* — Edell, Shapiro & Finnan, LLC

(57) ABSTRACT

A Buck-Boost converter includes an input node to receive a supply voltage and a supply current, an output node, an inductor, capacitors including a load capacitor and a helper capacitor, and transistors to configure the Buck-Boost converter to: when the supply voltage is turning ON, operate in a Buck mode to (a) in a first cycle, use the supply current to charge the capacitors and an inductor magnetic field, and (b) in a second cycle, without using the supply current, discharge the inductor and the capacitors through the output node, to limit an inrush current; and when the supply voltage is turning OFF, operate in a Boost mode to (c) in a third cycle, cause the helper capacitor, but not the load capacitor, to charge the magnetic field, and (d) in a fourth cycle, discharge the inductor, and the capacitors, through the output node, to extend a voltage hold-up time.

20 Claims, 10 Drawing Sheets

Supply turning ON, Buck Mode 1st cycle - Q1 and Q3 ON, supply voltage charges C1, C2

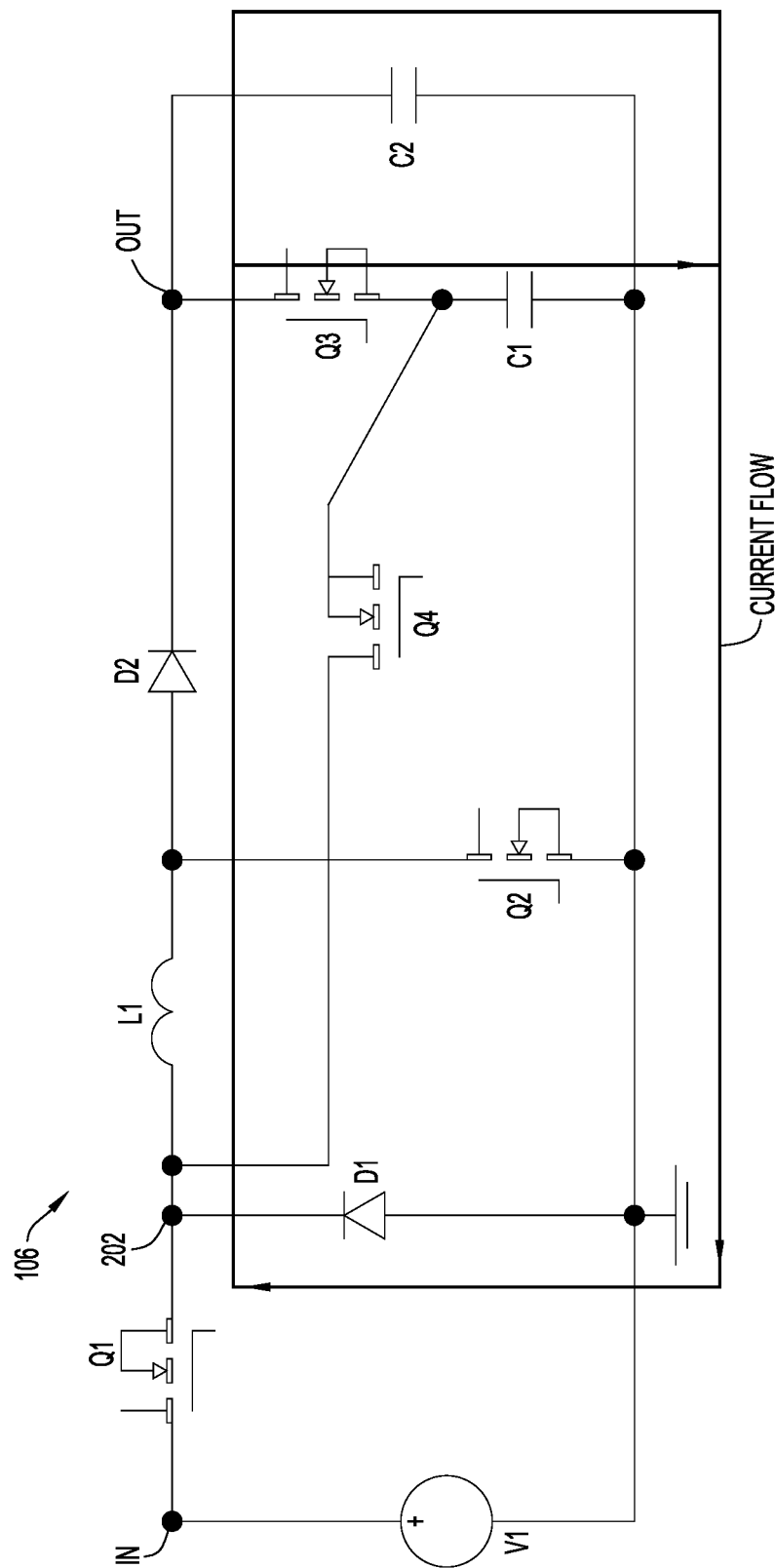
FIG.3B Supply turning ON, Buck Mode 2nd cycle - D2 and Q3 ON, freewheeling operation

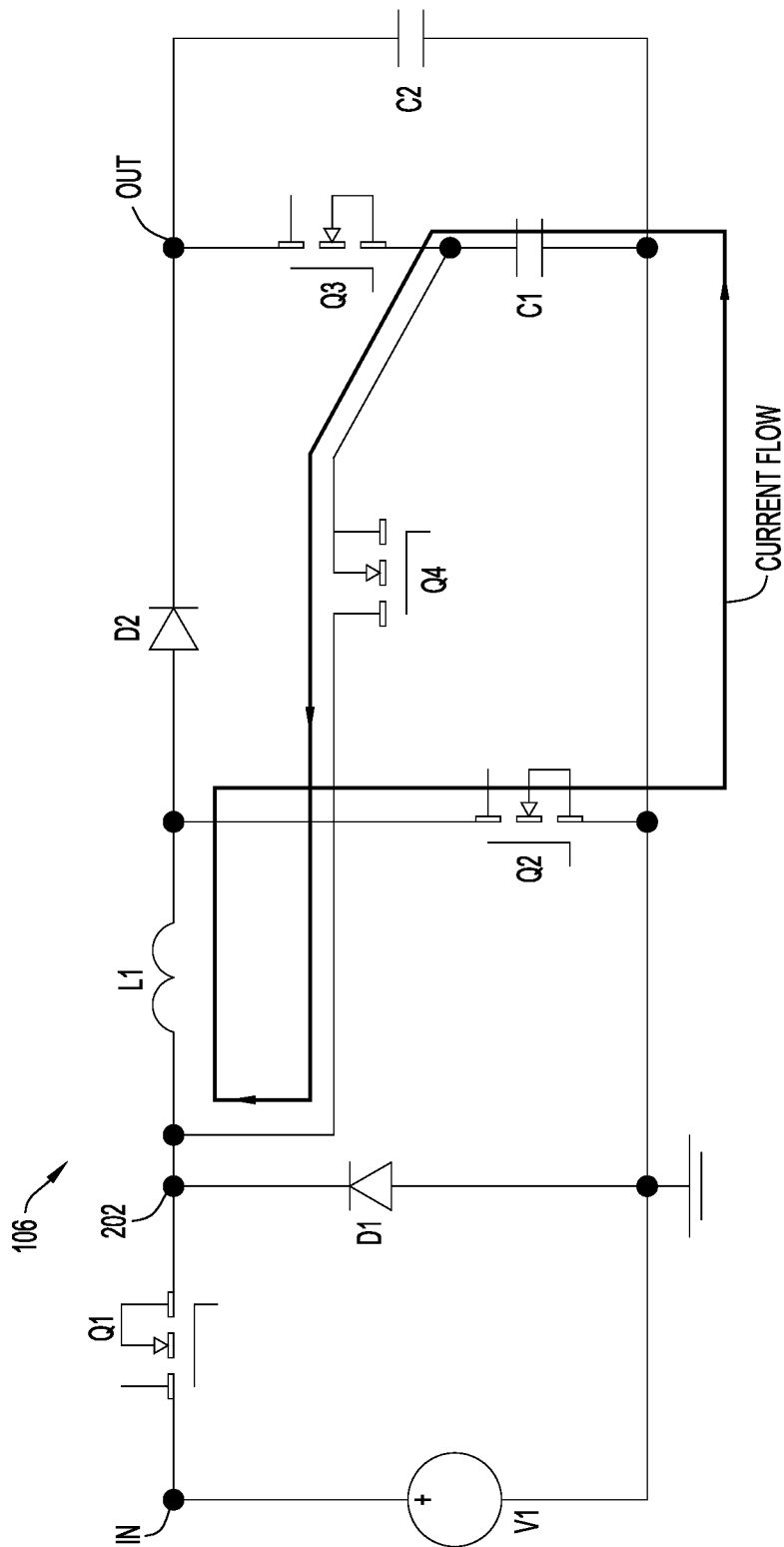

Supply turning OFF, Boost Mode 2nd cycle - Q4 and D2 ON, freewheeling operation

ACTIVE INRUSH CURRENT LIMITATION AND HOLD-UP TIME EXTENSION CIRCUIT

TECHNICAL FIELD

The present disclosure relates to power supply circuits.

BACKGROUND

A power supply may be designed to meet certain power supply specifications, including power ON/OFF specifications. The power ON/OFF specifications may specify a level of inrush current to be tolerated and suppressed when a power supply turns ON, a temperature limit, and an output voltage hold-up time when the power supply turns OFF. Conventional power supply circuits may use resistors to limit inrush current. The resistors may run too hot when the power supply turns ON. Thus, the resistors are coupled with bulky heatsinks to lower the temperature. Bulk capacitors may be used to extend the voltage hold-up time, but the size and cost of the bulk capacitors become significant factors in limiting maximum power density of any power supply circuit.

BRIEF DESCRIPTION OF THE DRAWINGS

FIG. 3B shows the Buck-Boost converter of FIG. 2 operating in a second cycle of the Buck mode when the supply voltage is turning ON, according to an example embodiment.

FIG. 4A shows the Buck-Boost converter of FIG. 2 operating in a first cycle of a Boost mode when the supply voltage is turning OFF, according to an example embodiment.

DESCRIPTION OF EXAMPLE EMBODIMENTS

Overview

An apparatus is provided that comprises a Buck-Boost converter. The Buck-Boost converter includes an input node to receive a supply voltage and a supply current, an output node to be coupled to a load, an inductor, capacitors including a load capacitor and a helper capacitor, and transistors to configure the Buck-Boost converter to: when the supply voltage is turning ON, operate in a Buck mode to (a) in a first cycle, use the supply current to charge the capacitors in parallel and charge a magnetic field in the inductor, and (b) in a second cycle, without using the supply current, discharge the inductor and the capacitors through the output node, to limit an inrush of the supply current; and when the supply voltage is turning OFF, operate in a Boost mode to (c) in a third cycle, cause the helper capacitor, but not the load capacitor, to charge the magnetic field, and (d) in a fourth cycle, discharge the inductor, and the capacitors, through the output node, to extend a voltage hold-up time at the output node.

Example Embodiments

Figure 1:
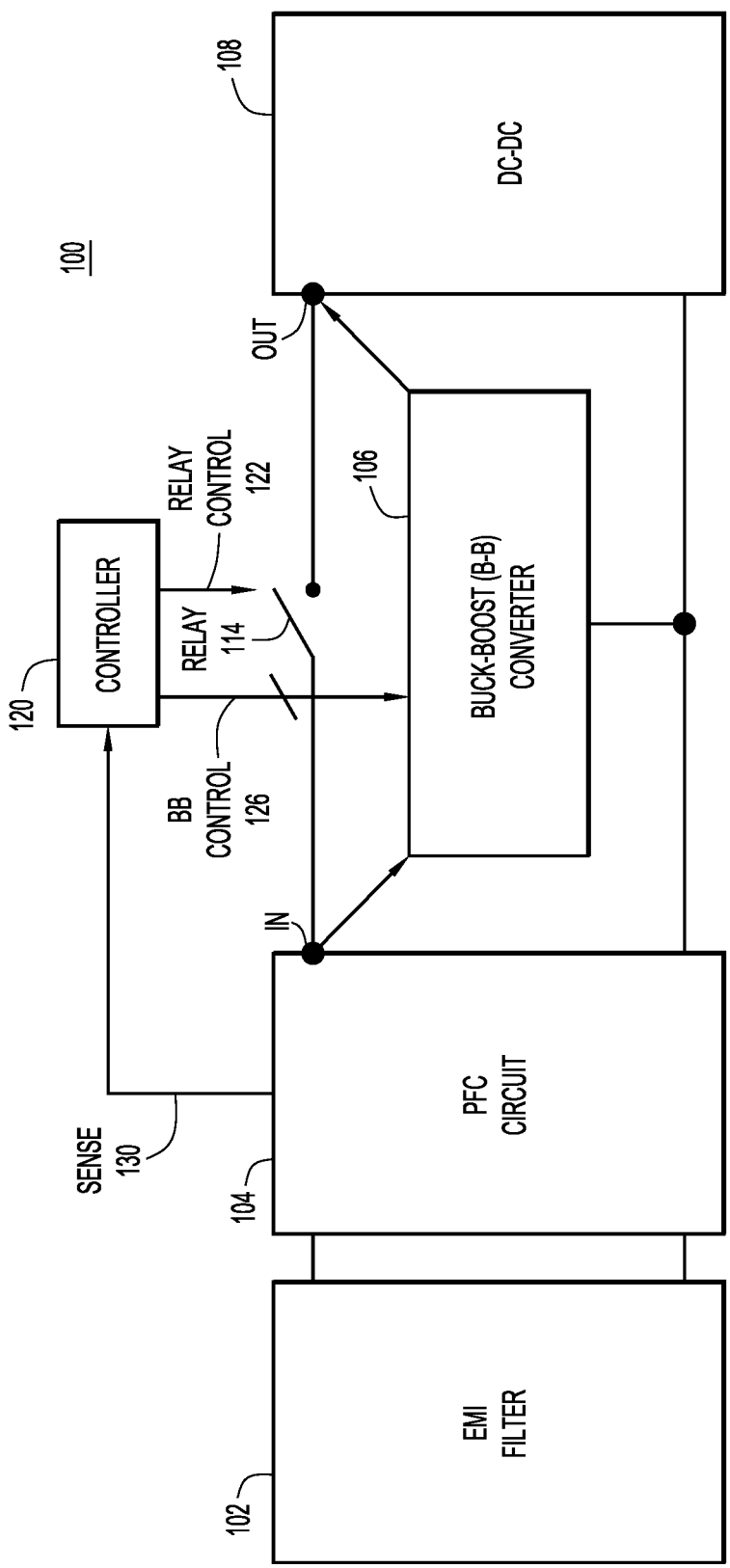
FIG. 1 is a block diagram of a power supply system that includes a Buck-Boost (B-B) converter to limit inrush current when the power supply system is turning ON and to extend a hold-up time of an output voltage when the power supply system is turning OFF, according to an example embodiment.

With reference to FIG. 1, there is a block diagram of an example power supply system 100. Power supply system 100 may perform alternating current (AC) to direct current (DC) power conversion, or may perform DC-DC power conversion. Power supply system 100 includes an electromagnetic interference (EMI) filter 102, a power factor conversion (PFC) circuit 104, a Buck-Boost (B-B) converter/circuit 106 configured according to embodiments presented herein, and a DC-DC converter 108 connected to each other in series from the EMI filter to the DC-DC converter. In various embodiments, one or more of EMI filter 102, PFC circuit 104, and DC-DC converter 108 may be omitted or rearranged. B-B converter 106 includes an input node or terminal IN to receive a supply voltage/current from an output of PFC circuit 104, and an output node or terminal OUT to provide an output voltage/current to an input of DC-DC converter 108, based in part on the supply voltage/current. DC-DC converter 108 represents a load coupled to output node OUT. System 100 also includes an optional bypass relay 114 having an input coupled to input node IN and an output coupled to output node OUT, such that the relay is connected in parallel with B-B converter 106 when the relay is closed. In other embodiments, B-B converter 106 may be employed without relay 114.

Power supply system 100 further includes a controller 120 to generate and provide to relay 114 a relay control signal 122 to selectively open and close the relay. Controller 120 also generates and provides to B-B converter 106 B-B control signals 126 to control/configure the B-B converter for different modes of operation. Controller 120 may also receive a sense signal 130 that indicates to the controller a state of the supply voltage/current, i.e., whether the supply voltage/current is turning ON (i.e., rising quickly), is turning OFF (i.e., falling quickly), or is in a quiescent/steady ON or OFF state. In an example, PFC circuit 104, or some other power supply circuit, originates sense signal 130. Alternatively, sense signal 130 may be taken from input node IN, in which case, controller 120 monitors the level of the sense signal (e.g., the supply voltage/current), and determines the state of the supply voltage/current (e.g., rising, falling, or quiescent) based on the monitoring, using any known or hereafter developed techniques. For example, controller 120 may compare the level of sense signal 130 against predetermined voltage/current thresholds indicative of whether the supply voltage/current is rising, falling, or in a quiescent state. Controller 120 may include analog circuitry, digital circuitry, control logic, firmware, software and/or a combination thereof to generate control signals 122 and 126. The control logic may include a microcontroller to execute instructions stored/encoded in a memory to implement controller operations described herein.

Operation of power supply system 100 is now described briefly. When power supply system 100 is turning ON, for an initial short time period (e.g., in a range of approximately 10-50 milliseconds (ms), although longer or shorter time periods are possible), controller 120 asserts relay control signal 122 to a first state to open relay 114 to force an inrush of the supply current at input node IN to flow through B-B converter 106, which activates the B-B converter. Concurrently, controller 120 also asserts B-B control signals 126 to a first state to configure B-B converter 106 to operate in a Buck mode. While in the Buck mode, B-B converter 106 limits or suppresses the inrush current at input node IN (due to the supply voltage/current turning ON), at output node OUT.

After the initial time period, once the inrush current has abated and the supply voltage/current has attained a quiescent state (i.e., steady ON state), controller 120 asserts relay control signal 122 to a second state to close the relay. While closed, relay 114 provides a path for the supply current to bypass B-B converter 106, which deactivates the B-B converter.

Subsequently, when supply system 100 is turning OFF, for a short time period (e.g., in a range of approximately 10-50 ms, although longer time periods are possible), controller 120 again asserts relay control signal 122 to the first state to open relay 114 to force the supply current flow into B-B converter 106 through input node IN, which activates the B-B converter. Concurrently, controller 120 also asserts B-B control signals 126 to a second state to configure B-B converter 106 to operate in a Boost mode. While in the Boost mode, B-B converter 106 extends a hold-up time of a falling output voltage at output node OUT.

Figure 2:
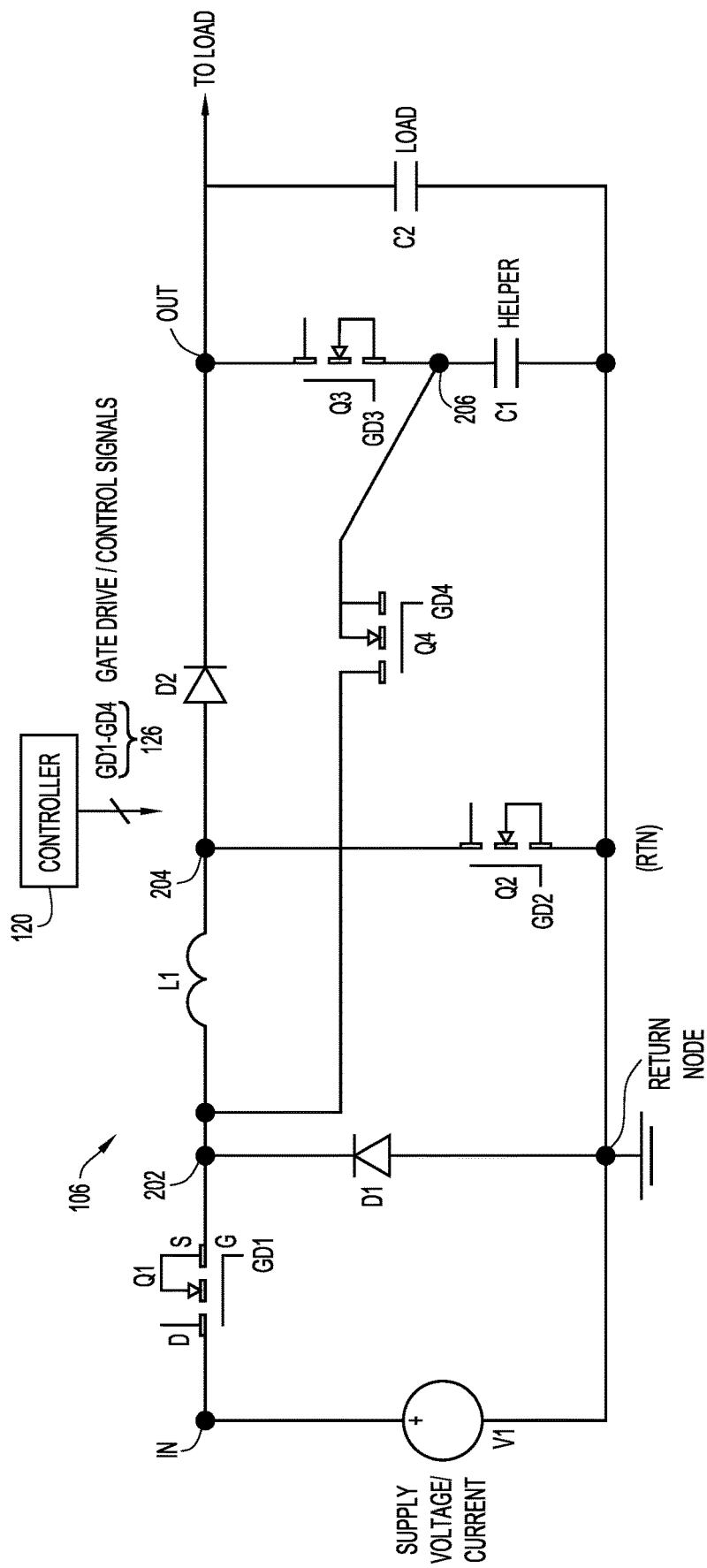
FIG. 2 is a circuit diagram of the Buck-Boost converter, according to an example embodiment.

With reference to FIG. 2, there is a circuit diagram of B-B converter 106 according to an embodiment. As used herein, the term "connected to" (and similarly "coupled to"), unless specified otherwise, covers an arrangement in which components are directly connected to each other, and an arrangement in which the components are indirectly connected to each other through one or more intermediate components. B-B converter 106 includes the following: input node IN to receive a supply voltage V1 (and a corresponding supply current); a field effect transistor (FET) Q1 having a gate (G) to receive a gate drive signal GD1 from controller 120, and a source-drain (S-D) current path (simply "S-D path" or "current path") connected to the input node IN and a first intermediate node 202; an inductor L1 connected to the first intermediate node 202 and a second intermediate node 204; a first diode D1 having a cathode (−) and an anode (+) connected to the first intermediate node 202 and a return node RTN, respectively; a second FET Q2 having a gate to receive a gate drive signal GD2 from the controller, and an S-D path connected to the second intermediate node 204 and the return node RTN; a second diode D2 having an anode and a cathode connected to the second intermediate node 204 and output node OUT, respectively; a third FET Q3 having a gate to receive a gate drive signal GD3 from the controller, and an S-D path connected to the output node OUT and a third intermediate node 206; a first/helper capacitor C1 connected to the third intermediate node 206 and the return node RTN; a second/load capacitor C2 connected to the output node OUT, and to the return node RTN; and a fourth FET Q4 having a gate to receive a gate drive signal GD4 from the controller, and an S-D path connected to the third intermediate node 206 and the first intermediate node 202 (i.e., to one end of inductor L1).

According to the aforementioned circuit topology, and as will be described more fully below, the S-D path of FET Q1, inductor L1, and diode D2 are connected in series with each other from input node IN to output node OUT. Helper capacitor C1 and load capacitor C2 may be bulk capacitors, and a capacitance of the load capacitor C2 may be greater than a capacitance of the helper capacitor C2 (i.e., the capacitance of C1 is less than the capacitance of C2). Helper capacitor C1 is selectively connected to (or disconnected from) output node OUT and load capacitor C2 through the S-D path of FET Q3 under control of gate drive signal GD3, and load capacitor C2 is connected in parallel with series-connected helper capacitor C1 and the S-D path of FET Q3. In addition, helper capacitor C1 is selectively connected to (or disconnected from) inductor L1 through the S-D path of FET Q4 under control of gate drive signal GD4. Capacitors C1 and C2 may both be bulk capacitors and, in the circuit topology, are split or divided both topologically and functionally: for example, as will be described below, during the Boost mode, load capacitor C2 primarily performs a voltage hold-up function at output node OUT, while helper capacitor C1 is coupled back to inductor L1 to charge a magnetic field of the inductor, which also assists with the voltage hold-up function.

Each FET Qi is depicted as an n-channel metal oxide semiconductor FET (n-MOSFET) in the example of FIG. 2. More generally, each device Qi may be a transistor of any type that can be controlled to operate as a current switch (i.e., a switch transistor), including, but not limited to, an n or p-channel FET, an n or p-MOSFET, a bipolar transistor, and so on. Each transistor Qi includes a current path (e.g., an S-D path) that may be turned ON or OFF responsive to a control signal applied to a control terminal (e.g., a gate) of the transistor (referred to as turning the transistor ON or OFF). In addition, diodes D1 and D2 may be standard diode devices (i.e., bipolar semiconductor devices) or, alternatively, diode configured transistors. Accordingly, B-B converter 106 may be implemented using all-active semiconductor devices (e.g., transistors).

In the example of FIG. 2, controller 120 generates gate drive signals GD1-GD4 (collectively representing B-B control signals 126, also referred to as transistor control signals 126) and applies the gate drive signals to respective gates of FETs Q1-Q4 to control B-B converter 106 to operate in either the Buck mode or the Boost mode. That is, each FET Qi operates as a switch FET that fully turns ON (i.e., is closed) or fully turns OFF (i.e., is open), responsive to first and second states of gate drive signal GDi, respectively. When FET Qi is ON (e.g., $V_{gs} > V_{th}$, where $V_{gs}$ is a gate-to-source voltage (also denoted "VGS") of FET Qi, and $V_{th}$ is a threshold voltage of FET Qi), the S-D path of FET Qi has a low resistance and thus passes current (i.e., S-D current). When FET Qi is OFF (e.g., $V_{gs} < V_{th}$), the S-D path has a high resistance and thus blocks current.

As mentioned above, FETs Q1-Q4 configure B-B converter 106, responsive to gate drive signals GD1-GD4, to operate in (i) a Buck mode (shown in FIGS. 3A, 3B) when supply voltage V1 (and its associated supply current) is turning ON to limit inrush current to a load connected to output node OUT, or (ii) in a Boost mode (shown in FIGS. 4A, 4B) when the supply voltage V1 is turning OFF to extend a voltage hold-up time of a falling voltage at the output node OUT, as will be described more fully below in connection with FIGS. 3A-4B. For the sake of clarity, labels "DV1"-"DV4" for the gate drive signals are omitted from FIGS. 3A-4B.

In the ensuing description, various components of B-B converter 106 may be referred to by their labels, only, e.g., FET Q1, inductor L1, and diode D1 may be referred to as "Q1," "L1," and "D1," respectively, and so on.

Figure 3A:
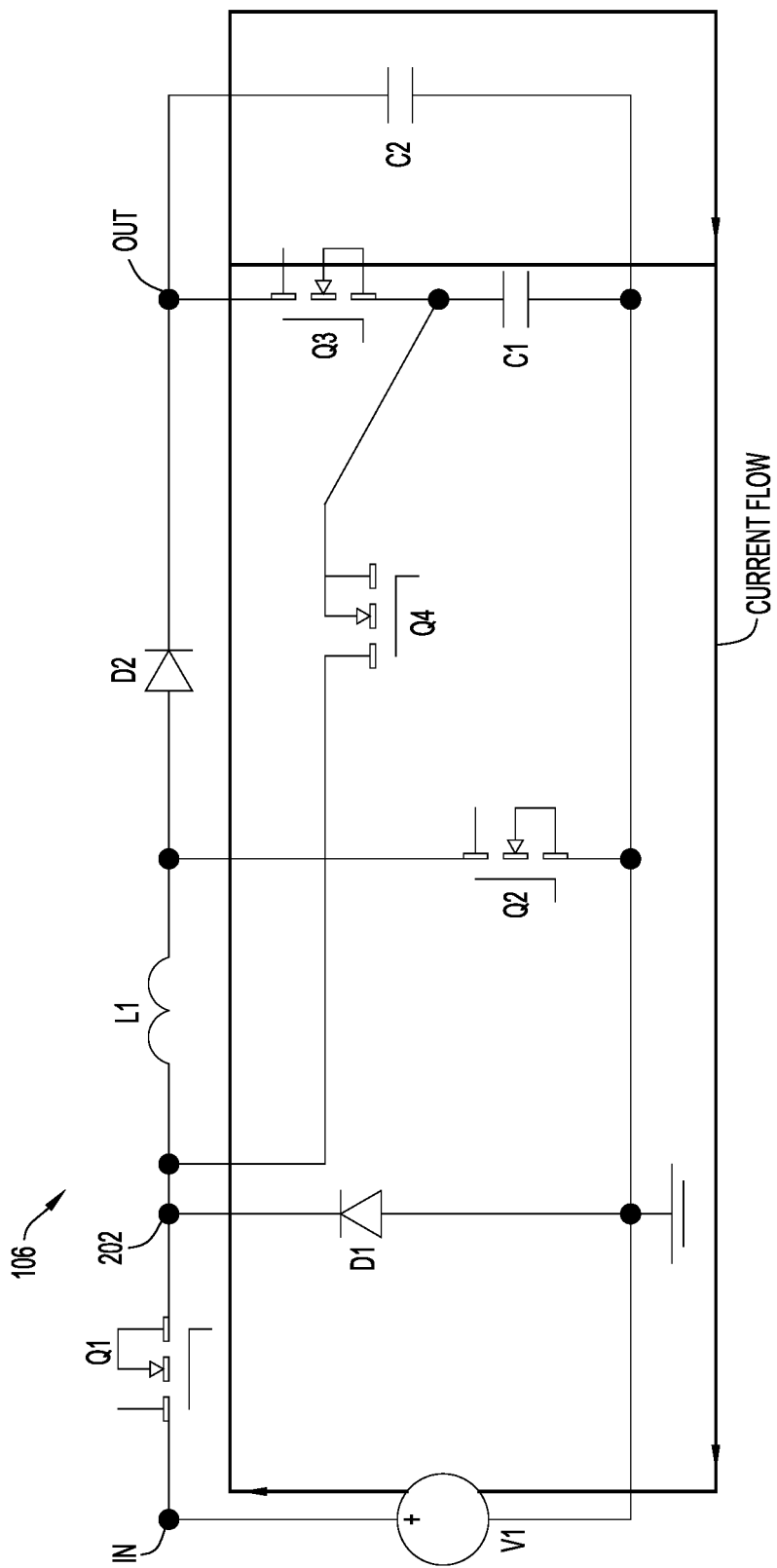
FIG. 3A shows the Buck-Boost converter of FIG. 2 operating in a first cycle of a Buck mode when a supply voltage is turning ON, according to an example embodiment.

FIGS. 3A and 3B show B-B converter 106 operating in the Buck mode when supply voltage (V1) is turning ON. In the Buck mode, gate drive signal GD1 follows an oscillator waveform, e.g., a square wave, that repeatedly switches Q1 ON (closed) and OFF (open) to establish respective first and second cycles of the Buck mode. While Q1 cycles ON and OFF during the first and second cycles of the Buck mode, respectively, Q2 is always OFF, Q3 is always ON, and Q4 is always OFF responsive to gate drive signals GD2, GD3, and GD4, respectively.

The first cycle of the Buck mode is shown in FIG. 3A. During the first cycle, with Q1 ON (which connects input node IN, and thus supply voltage V1, to L1), Q3 ON, Q2 and Q4 both OFF, D1 OFF (i.e., reverse-biased), and D2 ON (i.e., forward-biased), an inrush of supply current (i.e., "inrush supply current") associated with rising supply voltage V1 (at input node IN) flows through L1 and D2 to the load connected to output node OUT, and also to C1 and C2, which are both connected to the output node OUT in parallel. The inrush supply current charges C1 and C2. In addition, while flowing through L1, the inrush supply current builds or charges a magnetic field in L1. The above-mentioned circuit components (e.g., L1, D2, C1, and C2) through which the inrush supply current flows reduces the inrush current to a ripple current.

The second cycle of the Buck mode is shown in FIG. 3B. During the second cycle, Q1 is OFF (which disconnects input node IN, and thus supply voltage V1, from L1), Q3 is ON, Q2 and Q4 are both OFF, and D1 and D2 are both ON. Under these conditions, the magnetic field in inductor L1 charged during the first cycle begins to decay and supplies a decaying inductor voltage/current to output node OUT. Also, C2 discharges current to the load through output node OUT. The current from C2 augments the decaying inductor voltage/current at output node OUT. The second cycle of the Buck mode may be referred to as a "freewheeling" cycle because current flow through D2 persists while the circuitry is isolated from supply voltage V1.

In summary, when supply voltage V1 is turning ON, B-B converter 106 operates in the Buck mode to (a) in the first cycle, use the supply current entering input node IN (e.g., enable the supply current) to charge C1 and C2 in parallel, and to charge the magnetic field in L1, and (b) in the second cycle, without using the supply current (i.e., while the circuitry is isolated from the supply voltage), discharge L1, and C1 and C2 in parallel, through output node OUT, to limit the inrush of supply current. The first cycle-second cycle sequence repeats. Also, Q1 and Q3 may be referred to as first and second Buck transistors, respectively, because they help enable the Buck mode.

Figure 4B:
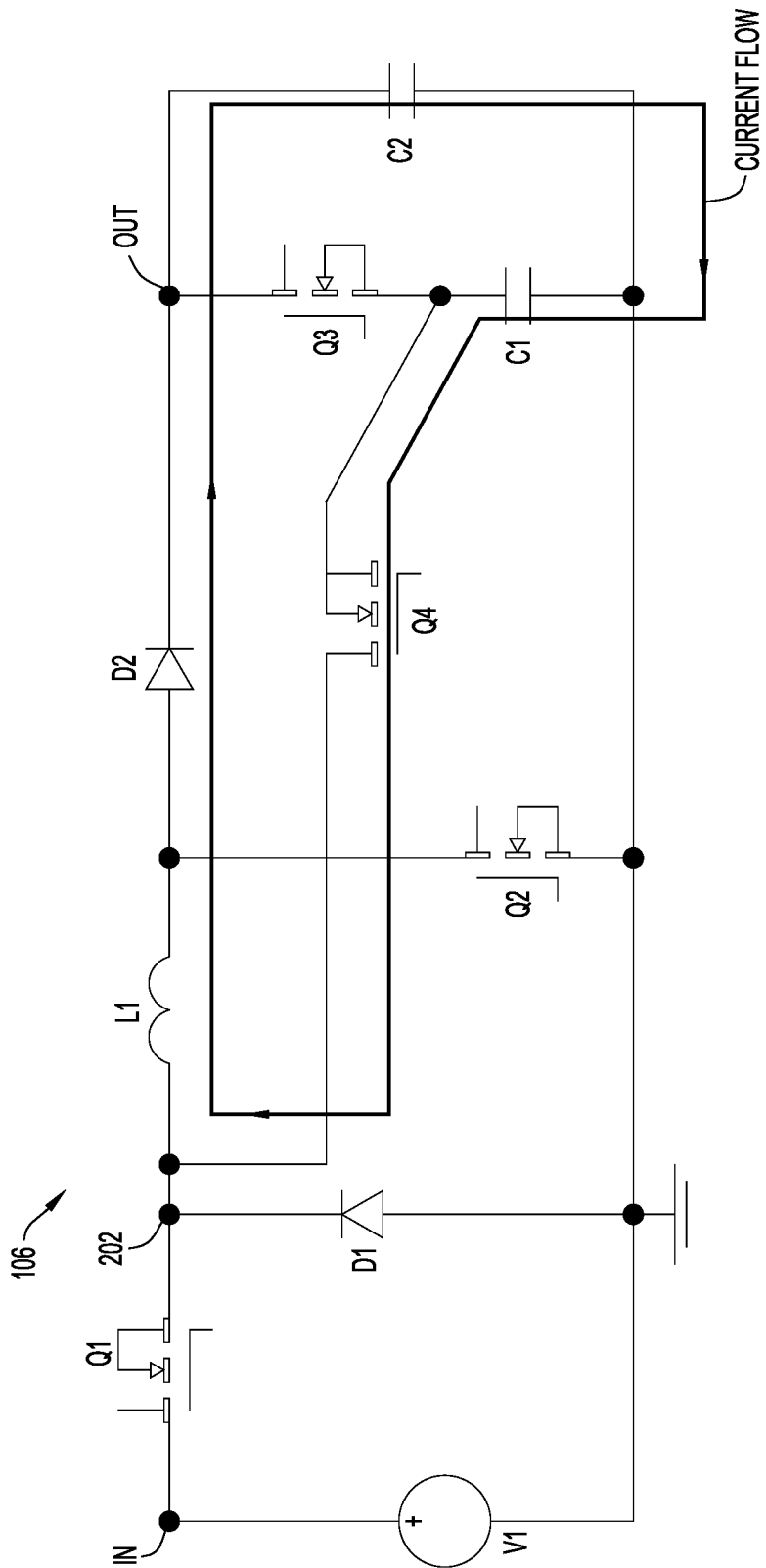
FIG. 4B shows the Buck-Boost converter of FIG. 2 operating in a second cycle of the Boost mode when the supply voltage is turning OFF, according to an example embodiment.

FIGS. 4A and 4B show B-B converter 106 operating in the Boost mode when supply voltage (V1) is turning OFF. In the Boost mode, gate drive signal GD2 follows an oscillator waveform, e.g., a square wave, which repeatedly switches Q2 ON (closed) and OFF (open) to establish, respectively, first and second cycles of the Boost mode. To avoid confusion with the first and second cycles of the Buck mode, the first and second cycles of the Boost mode may be referred to as "third" and "fourth" cycles of the Boost mode, respectively. While Q2 cycles ON and OFF in the Boost mode, Q1 is always ON, Q3 is always OFF, and Q4 is always ON responsive to gate drive signals GD1, GD3, and GD4, respectively. Notwithstanding that Q1 is always ON, input node IN does not supply appreciable supply voltage V1 or supply current to other components of B-B converter 106 because V1 is turning OFF.

The first cycle of the Boost mode is shown in FIG. 4A. During the first cycle of the Boost mode, Q2 is ON, Q1 is ON, Q3 is OFF (which disconnects C1 from output node OUT), Q4 is ON (which connects C1 to L1), and D1 and D2 are both OFF. In this configuration, charge accumulated on C1 during a previous second cycle of the Boost phase (described below), discharges through L1, which charges the magnetic field in L1. That is, C1 discharges current through L1, to charge its magnetic field. Supply voltage V1/current cannot be relied on to charge the magnetic field in L1 because the supply voltage is turning OFF, thus the discharge of C1 serves this purpose instead.

The second cycle of the Boost mode is shown in FIG. 4B. During the second cycle of the Boost mode, Q2 is OFF, Q1 is ON, Q3 is OFF, Q4 is ON, and D1 is OFF, but D2 is ON. In this configuration, C1 and C2 discharge through, and thus supply current to, output node OUT. Concurrently, the magnetic field in L1, charged-up by C1 during the first cycle of the Boost phase, decays and, as a result, L1 supplies a decaying voltage/current to output node OUT. The decaying voltage/current augments the current supplied to output node OUT by C1 and C2, which extends a hold-up time of the falling voltage at the output node. The second cycle of the Boost mode may be referred to as a "freewheeling" cycle because current flow through D2 persists while supply voltage V1 is sufficiently low to have little or no drive impact on the circuitry.

In summary, when the supply current is turning OFF, B-B converter 106 operates in the Boost mode to (a) in a first (or "third") cycle of the Boost mode, separate C1 and C2 (i.e., disconnect C1 from C2) to enable current to flow from C1, but not C2, to L1 to charge the magnetic field in L1, and (d) in a second (or "fourth") cycle of the Boost mode, discharge previously charged L1 through output node OUT (i.e., permit the magnetic field of L1 to decay and, as a result, supply a decaying voltage/current to output node OUT), and concurrently discharge C1 and C2 through output node OUT, to extend the hold-up time of the falling voltage at the output node. The first cycle-second cycle sequence repeats. Also, Q2 and Q4 may be referred to as first and second Boost transistors, respectively, because they help enable the Boost mode.

As described above, in the Buck mode, Q3 is ON to connect both C1 and C2 to the output node, but Q4 is OFF to disconnect/isolate C1 from L1. In contrast, in the Boost mode, Q3 is OFF to disconnect C1, but not C2, from the output node OUT (i.e., to separate/isolate C1 from C2 with respect to the output node OUT and isolate C1 from the output node OUT), and Q4 is ON to connect C1 to L1, to permit a feedback of charge on C1 to L1.

Figure 5:
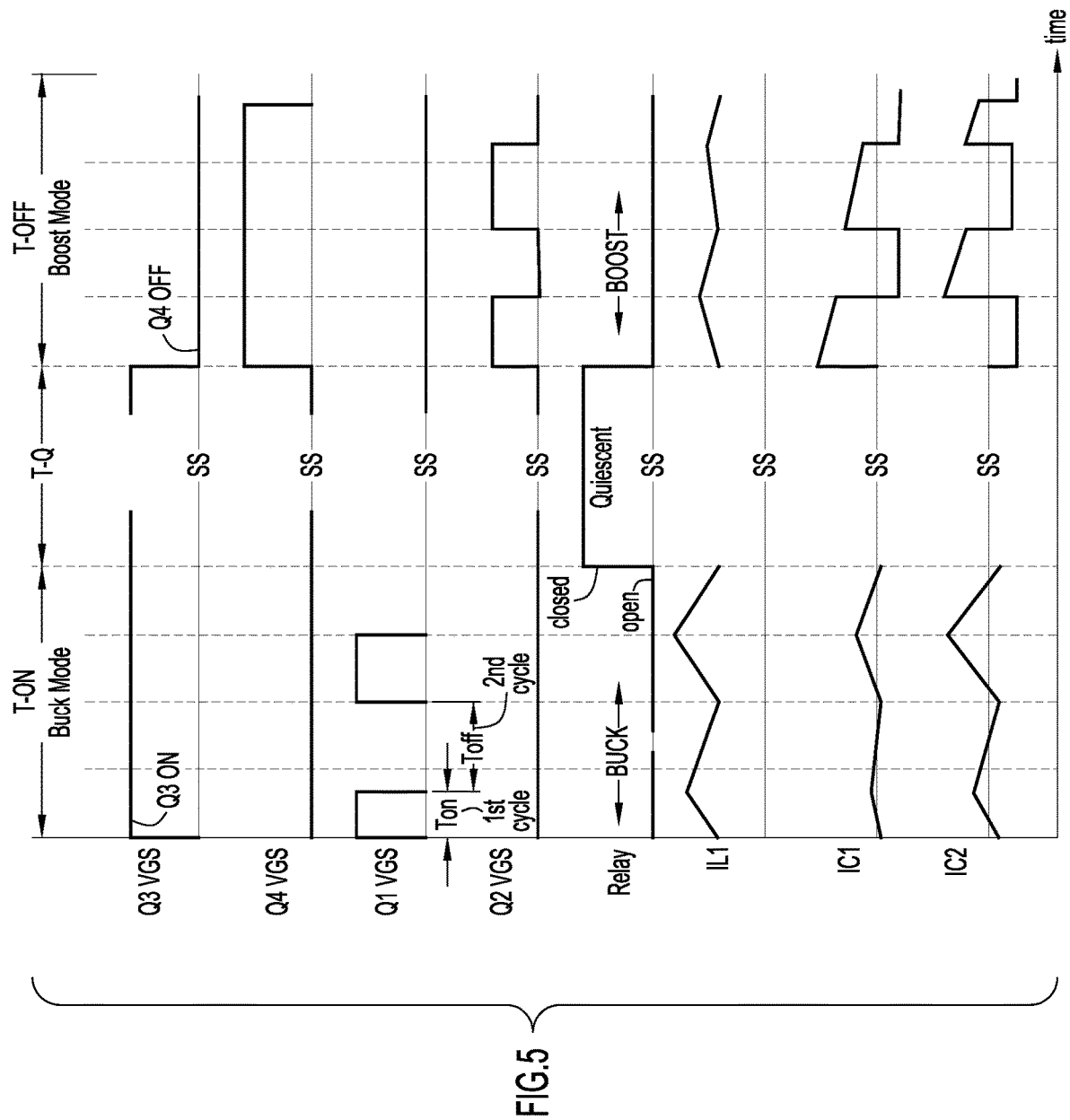
FIG. 5 shows a series of timing waveforms for various components of the Buck-Boost converter corresponding to the operations of FIGS. 3A-4B, according to an example embodiment.

With reference to FIG. 5, there are shown a series of timing waveforms for various components of B-B converter 106. FIG. 5 shows a sequence of power supply phases including T-ON (Buck mode) when the power supply is turning ON, T-Quiescent (T-Q) when the power supply has reached a quiescent ON state, and T-OFF (Boost mode) when the power supply is turning OFF. For each of waveforms Qi VGS, a low/high level indicates the corresponding FET Qi is OFF (open)/ON (closed). Similarly, for waveform Relay, a low/high level indicates relay 114 is open/closed.

As shown in FIG. 5, during the Buck mode, relay R1 is open to engage B-B converter 106, and Q1 VGS cycles ON and OFF to cycle Q1 ON and OFF. The shapes of ripple currents IC1, IC2 supplied by capacitor C1, C2 are similar to the shape of ripple current IL1 supplied by L1. The ripple currents represent suppressed inrush supply current. During the quiescent phase, relay R1 is closed, to disengage B-B converter 106. During the Boost mode, relay R1 is open again to engage B-B converter 106. Also, Q2 VGS cycles ON and OFF to cycle Q2 ON and OFF. As currents IC1, IC2 supplied by C1, C2 fall, current IL1 supplied by L1 tends to maintain its level to augment the fall of IC1, IC2, which extends the hold-up time of the output voltage.

Figure 6:
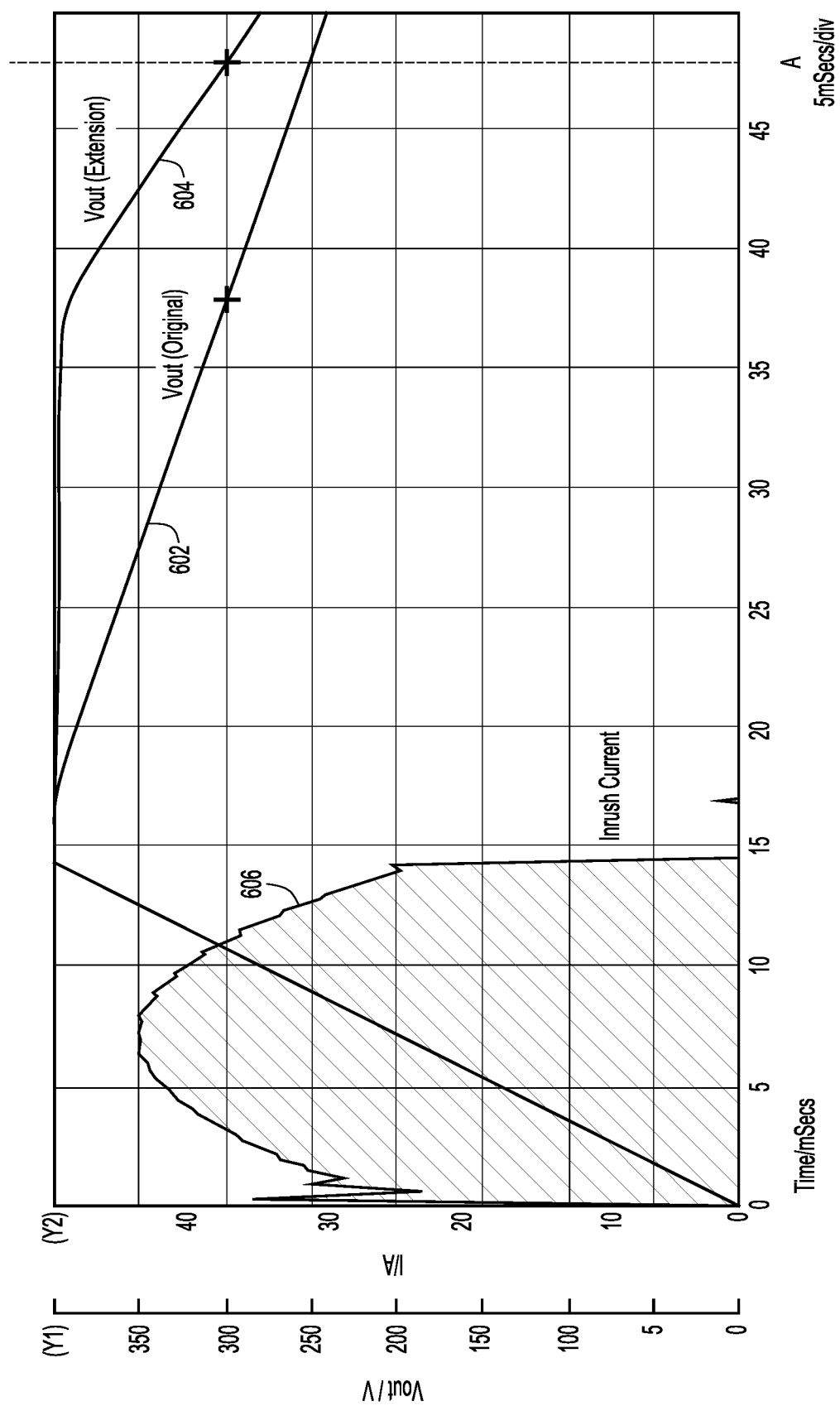
FIG. 6 shows comparison plots of output voltage vs. time at an output node of a power supply circuit with and without the Buck-Boost converter, and a plot of inrush current vs. time at the output node of the Buck-Boost converter, according to an example embodiment.

With reference to FIG. 6, there are plots 602 and 604 of voltage Vout vs. time at output node OUT and a plot 606 of inrush current vs. time at output node OUT. Plot 602 shows Vout (original) in the absence of B-B converter 106, and plot 604 shows Vout (extension) using the B-B converter 106. The extended hold-up time of the voltage of plot 604 is evident from a comparison of the two plots. Plot 606 shows suppression of the inrush current by B-B converter 106, beginning at about 7 ms after power ON.

The following example compares circuitry real-estate volume and cost for a conventional circuit (I) against volume and cost of B-B converter 106 (II) that achieve similar suppression of inrush current upon power ON and extension of voltage hold time on power OFF. The power supply requirements used for the comparison are power out Po=3000 W, voltage out Vo=400V, and required hold-up time THOLD=16 ms.

I. Conventional design: uses 2 capacitors of 820 micro-Farad (uF)*2.
   a. Volume~15*15*3.14*60*2+15*15*7.5=86468 mm$^3$.
   b. Cost~$9.62.

II. B-B converter 106: uses 2 smaller capacitors 470 uF*2.
   a. Volume~15*15*3.14*45*2+19.4*26.2*1.7=64449 mm$^3$.
   b. Cost $5.365.

The comparison above reveals that B-B converter 106 provides a more compact and affordable circuit compared to a conventional circuit to limit inrush current and extend voltage hold-up time.

Figure 7:
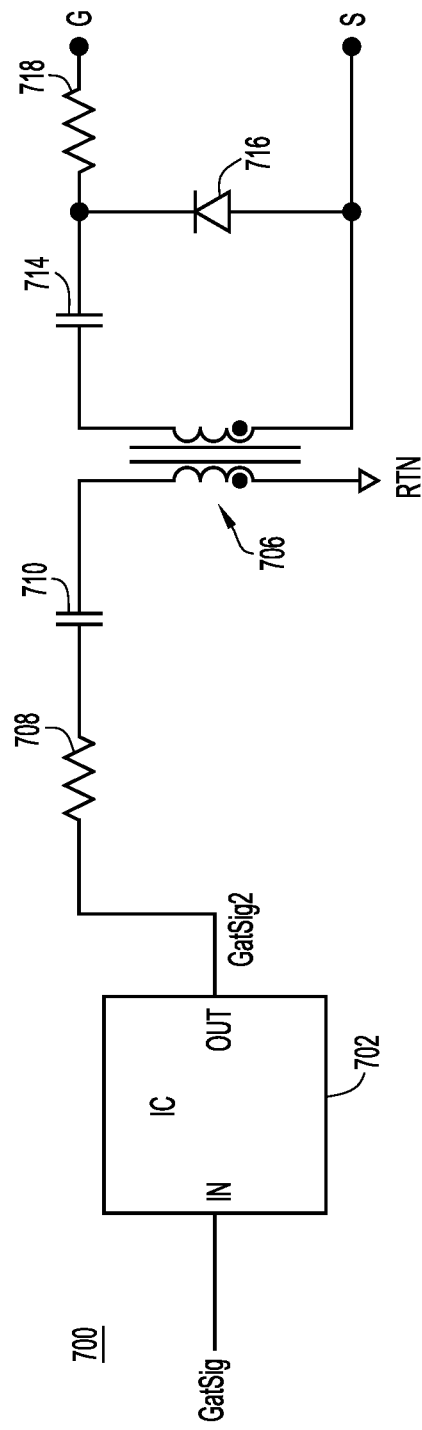
FIG. 7 is a circuit diagram of a first isolated gate driver to generate a gate drive signal, according to an example embodiment.

FIG. 7 is a circuit diagram of an example isolated gate driver 700 to generate a gate drive signal, e.g., gate drive signal GD1 or GD3. Multiple instances of gate driver 700 may be incorporated into controller 120. Gate driver 700 includes a gate driver integrated circuit (IC) 702 to receive a first gate drive signal GatSig, and to generate a second gate drive signal Gatsig2 based on the first gate drive signal. In an example, IC 702 may include a Texas Instruments IC UC C27517. IC 702 supplies Gatsig2 to an input winding of an isolation transformer 706 through a resistor 708 and a capacitor 710 that are connected to each other in series. An output winding of transformer 706 generates drive signals based on coupling between the input winding and the output winding. The output winding supplies the drive signals to a gate G and a source S of a respective FET through an output circuit including a capacitor 714, a diode 716, and a resistor 718 connected to each other as shown in FIG. 7.

Figure 8:
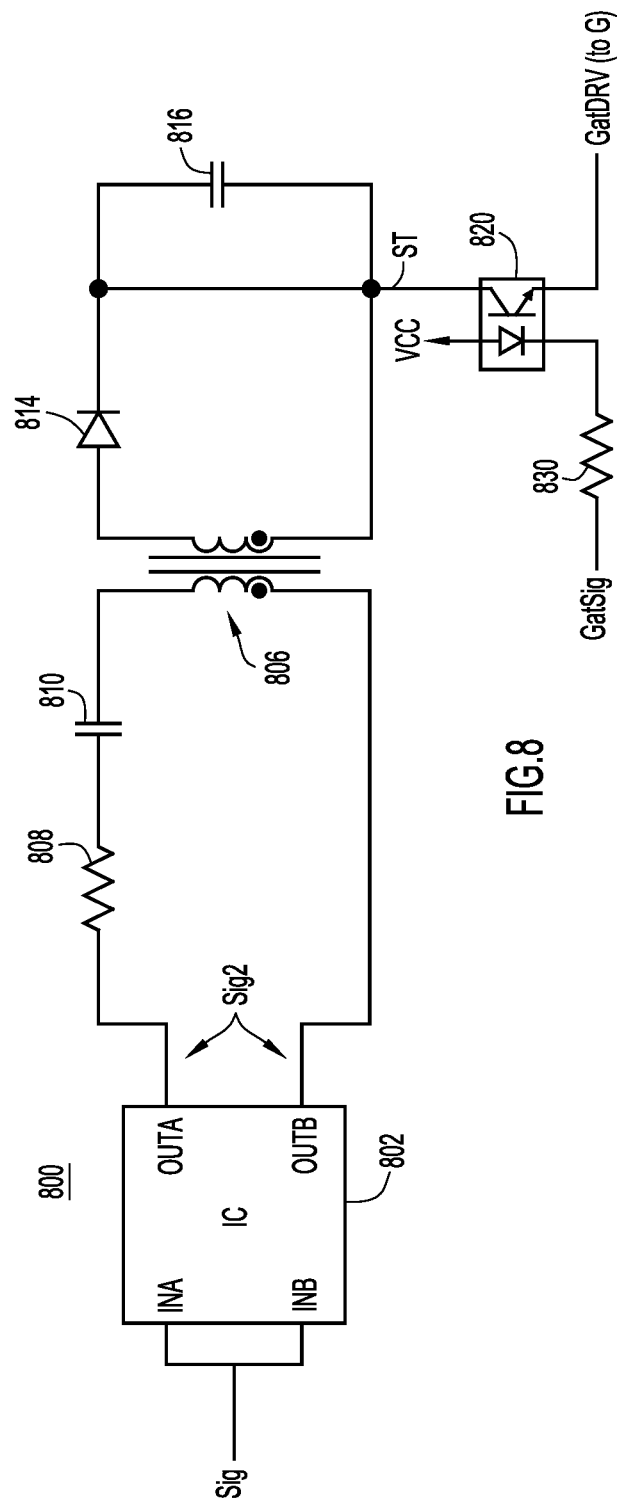
FIG. 8 is a circuit diagram of a second isolated gate driver to generate a gate drive signal to control a field effect transistor (FET), according to an example embodiment.

FIG. 8 is a circuit diagram of an example isolated gate driver 800 to generate a gate drive signal, e.g., gate drive signal GD2 or GD4. Multiple instances of gate driver 800 may be incorporated into controller 120. Gate driver 800 includes a gate driver integrated circuit (IC) 802 to receive a signal Sig, and to generate a double-ended signal Sig2 based on the signal. In an example, IC 802 may include a Texas Instruments IC UC C27525. IC 802 supplies Sig2 to an input winding of an isolation transformer 806 through a resistor 808 and a capacitor 810 that are connected to each other in series. Collectively, an output winding of transformer 806, a diode 814, and a capacitor 816, generate a signal ST responsive to Sig2. An output stage 820 generates signal GatDrv, to drive a FET gate, based on signal ST, responsive to a signal Gatsig applied to output stage 820 through a resistor 830.

Figure 9:
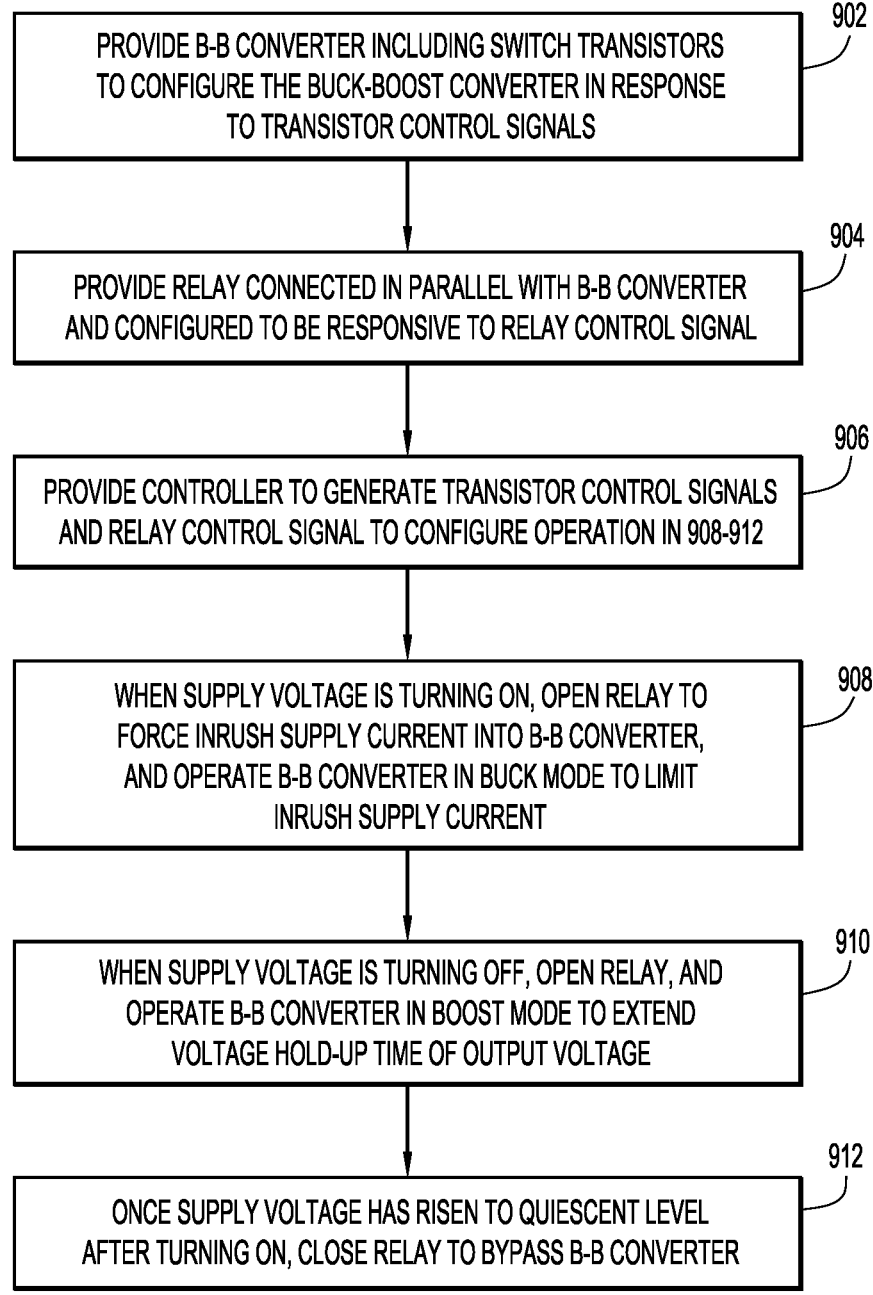
FIG. 9 is a flowchart of a method of controlling and operating the Buck-Boost converter, according to an example embodiment.

With reference to FIG. 9, there is a flowchart of an example method 900 of controlling and operating a B-B converter (e.g., B-B converter 106) based on operations described above.

At 902, a B-B converter is provided. The B-B converter includes an input node to receive a supply voltage and a supply current, an output node to be coupled to a load, and transistors to configure the B-B converter in response to transistor control signals applied to control terminals (e.g., gates) of the transistors to turn ON or turn OFF current paths of the transistors.

At 904, a relay, connected to the input node and the output node so as to be in parallel with the B-B converter, is provided. The relay is configured to be responsive to a relay control signal, which selectively opens or closes the relay.

At 906, a controller is provided. The controller is configured to generate the transistor control signals and the relay control signal, and to apply them to the B-B converter and the relay, to configure the B-B converter and the relay to perform next operations 908-912. That is, the transistor control signals and the relay control signals configure operations of the B-B converter and the relay.

At 908, when the supply voltage is turning ON, the relay is opened to force the supply current to flow into the B-B converter, and the B-B converter is configured to operate in a Buck mode to limit an inrush of the supply current.

At 910, when the supply voltage is turning OFF, the relay is opened, and the B-B converter is configured to operate in a Boost mode to extend a voltage hold-up time at the output node.

At 912, once the supply voltage has risen to a quiescent level after turning ON, the relay is closed so that the relay bypasses the B-B converter.

In summary, in one aspect, an apparatus is provided comprising: a Buck-Boost converter including an input node to receive a supply voltage and a supply current, an output node to be coupled to a load, an inductor, capacitors including a load capacitor and a helper capacitor, and transistors to configure the Buck-Boost converter to: when the supply voltage is turning ON, operate in a Buck mode to (a) in a first cycle, use the supply current to charge the capacitors in parallel and charge a magnetic field in the inductor, and (b) in a second cycle, without using the supply current, discharge the inductor and the capacitors through the output node, to limit an inrush of the supply current; and when the supply voltage is turning OFF, operate in a Boost mode to (c) in a third cycle, cause the helper capacitor, but not the load capacitor, to charge the magnetic field, and (d) in a fourth cycle, discharge the inductor, and the capacitors, through the output node, to extend a voltage hold-up time at the output node.

The Buck-Boost converter further includes a first Buck transistor of the transistors, the inductor, and a diode connected in series from the input node to the output node, and the helper capacitor is connected to the output node through a second Buck transistor of the transistors, and the load capacitor is connected to the output node in parallel with the helper capacitor and the second Buck transistor.

During the first cycle of the Buck mode, the first Buck transistor is ON and the second Buck transistor is ON to connect the load capacitor and the helper capacitor in parallel to the output node, and to enable the supply current to flow to the output node, and to the capacitors, through the inductor. During the second cycle of the Buck mode, the first Buck transistor is OFF to disconnect the input node from the output node, the second Buck transistor is ON, and current flows from the inductor, and from the capacitors, to the output node.

The Buck-Boost converter further includes a first Boost transistor of the transistors connected to the inductor, and a second Boost transistor of the transistors connected to the helper capacitor and the inductor. During the third cycle of the Boost mode, the first Boost transistor is ON and the second Boost transistor is ON to enable current to flow from the helper capacitor to the inductor to charge the magnetic field in the inductor, while the inductor is isolated from the output node by the diode. During the fourth cycle of the Boost mode, the first Boost transistor is OFF and the second Boost transistor is ON, and the inductor supplies current to the output node through the diode while the load capacitor supplies current to the output node.

The helper capacitor is connected to the output node and the load capacitor through a Buck transistor of the transistors, and the helper capacitor is connected to the inductor through a Boost transistor.

During the Buck mode the Buck transistor is ON to connect the helper capacitor to the load capacitor and the output node, and the Boost transistor is OFF to isolate the helper capacitor from the inductor. During the Boost mode the Buck transistor is OFF to isolate the helper capacitor from the load capacitor and the output node, and the Boost transistor is ON to connect the helper capacitor to the inductor.

A first capacitance of the helper capacitor is less than a second capacitance of the load capacitor.

The apparatus further comprises a controller to apply control signals to control terminals of the transistors to control the transistors to configure the Buck-Boost converter to operate in the Buck mode or the Boost mode, and a relay connected to the input node and the output node in parallel with the Buck-Boost converter. The relay is configured to open responsive to a relay control signal in a first state when the supply voltage is turning ON or OFF to force the supply current through the Buck-Boost converter, and close responsive to the relay control signal in a second state when the supply voltage is quiescent to provide a current path that bypasses the Buck-Boost converter.

In another aspect a method is provided comprising: providing a Buck-Boost converter including an input node to receive a supply voltage and a supply current, an output node to be coupled to a load, the Buck-Boost converter including an inductor, capacitors including a load capacitor and a helper capacitor, and transistors to configure the Buck-Boost converter to perform: when the supply voltage is turning ON, operating in a Buck mode to (a) in a first cycle, use the supply current to charge the capacitors in parallel and charge a magnetic field in the inductor, and (b) in a second cycle without using the supply current, discharge the inductor, and the capacitors in parallel, through the output node, to limit an inrush of supply current; and when the supply voltage is turning OFF, operating in a Boost mode to (c) in a third cycle, cause the helper capacitor, but not the load capacitor, to charge the magnetic field, and (d) in a fourth cycle, discharge the inductor, and the capacitors, through the output node, to extend a voltage hold-up time at the output node.

The Buck-Boost converter further includes the inductor and a diode connected in series from the input node to the output node, a first Boost transistor of the transistors connected to the inductor, and a second Boost transistor of the transistors connected to the helper capacitor and the inductor. The operating in the Boost mode includes, during the third cycle of the Boost mode, providing that the first Boost transistor is ON and the second Boost transistor is ON to enable current to flow from the helper capacitor to the inductor to charge the magnetic field in the inductor, while the inductor is isolated from the output node by the diode.

The operating in the Boost mode further includes, during the fourth cycle of the Boost mode, providing that the first Boost transistor is OFF and the second Boost transistor is ON, and the inductor supplies current to the output node through the diode while the load capacitor supplies current to the output node.

In a further aspect, a system is provided comprising: a Buck-Boost converter including an input node to receive a supply voltage and a supply current, an output node to be coupled to a load, and transistors to configure the Buck-Boost converter in response to transistor control signals; a relay, connected to the input node and the output node to be in parallel with the Buck-Boost converter, and configured to be responsive to a relay control signal; and a controller to generate the transistor control signals and the relay control signal to: when the supply voltage is turning ON, open the relay to force the supply current to flow into the Buck-Boost converter, and operate the Buck-Boost converter in a Buck mode to limit an inrush of the supply current; and when the supply voltage is turning OFF, open the relay, and operate the Buck-Boost converter in a Boost mode to extend a voltage hold-up time at the output node.

The controller is configured to, once the supply voltage has risen to a quiescent level after turning ON, generate the relay control signal to close the relay to bypass the Buck-Boost converter.

The Buck-Boost converter further includes an inductor, and capacitors including a load capacitor and a helper capacitor, and the Buck mode is configured to (a) in a first cycle, use the supply current to charge the capacitors in parallel and charge a magnetic field in the inductor, and (b) in a second cycle without using the supply current, discharge the inductor, and the capacitors in parallel, through the output node, to limit an inrush of the supply current. The Boost mode is configured to (a) in a first cycle, cause the helper capacitor, but not the load capacitor, to charge a magnetic field of the inductor, and (b) in a second cycle, discharge the inductor, and the capacitors, through the output node, to extend a hold-up time of a voltage at the output node.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An apparatus comprising:
a Buck-Boost converter including an input node to receive a supply voltage and a supply current, an output node to be coupled to a load, an inductor, capacitors including a load capacitor and a helper capacitor, and transistors to configure the Buck-Boost converter to:
when the supply voltage is turning ON, operate in a Buck mode to (a) in a first cycle, use the supply current to charge the capacitors in parallel and charge a magnetic field in the inductor, and (b) in a second cycle, without using the supply current, discharge the inductor and the capacitors through the output node, to limit an inrush of the supply current; and
when the supply voltage is turning OFF, operate in a Boost mode to (c) in a third cycle, cause the helper capacitor, but not the load capacitor, to charge the magnetic field, and (d) in a fourth cycle, discharge the inductor, and the capacitors, through the output node, to extend a voltage hold-up time at the output node.

2. The apparatus of claim 1, wherein:
the Buck-Boost converter further includes a first Buck transistor of the transistors, the inductor, and a diode connected in series from the input node to the output node; and
the helper capacitor is connected to the output node through a second Buck transistor of the transistors, and the load capacitor is connected to the output node in parallel with the helper capacitor and the second Buck transistor.

3. The apparatus of claim 2, wherein:
during the first cycle of the Buck mode, the first Buck transistor is ON and the second Buck transistor is ON to connect the load capacitor and the helper capacitor in parallel to the output node, and to enable the supply current to flow to the output node, and to the capacitors, through the inductor.

4. The apparatus of claim 2, wherein:
during the second cycle of the Buck mode, the first Buck transistor is OFF to disconnect the input node from the output node, the second Buck transistor is ON, and current flows from the inductor, and from the capacitors, to the output node.

5. The apparatus of claim 1, wherein:
the Buck-Boost converter further includes the inductor and a diode connected in series from the input node to the output node, a first Boost transistor of the transistors connected to the inductor, and a second Boost transistor of the transistors connected to the helper capacitor and the inductor.

6. The apparatus of claim 5, wherein:
during the third cycle of the Boost mode, the first Boost transistor is ON and the second Boost transistor is ON to enable current to flow from the helper capacitor to the inductor to charge the magnetic field in the inductor, while the inductor is isolated from the output node by the diode.

7. The apparatus of claim 5, wherein:
during the fourth cycle of the Boost mode, the first Boost transistor is OFF and the second Boost transistor is ON, and the inductor supplies current to the output node through the diode while the load capacitor supplies current to the output node.

8. The apparatus of claim 1, wherein:
the helper capacitor is connected to the output node and the load capacitor through a Buck transistor of the transistors, and the helper capacitor is connected to the inductor through a Boost transistor of the transistors; and
during the Buck mode the Buck transistor is ON to connect the helper capacitor to the load capacitor and the output node, and the Boost transistor is OFF to isolate the helper capacitor from the inductor.

9. The apparatus of claim 8, wherein:
during the Boost mode the Buck transistor is OFF to isolate the helper capacitor from the load capacitor and the output node, and the Boost transistor is ON to connect the helper capacitor to the inductor.

10. The apparatus of claim 1, wherein:
a first capacitance of the helper capacitor is less than a second capacitance of the load capacitor.

11. The apparatus of claim 1, further comprising:
a controller to apply control signals to control terminals of the transistors to control the transistors to configure the Buck-Boost converter to operate in the Buck mode or the Boost mode.

12. The apparatus of claim 1, further comprising:
a relay connected to the input node and the output node in parallel with the Buck-Boost converter.

13. The apparatus of claim 12, wherein, the relay is configured to:
open responsive to a relay control signal in a first state when the supply voltage is turning ON or OFF to force the supply current through the Buck-Boost converter; and
close responsive to the relay control signal in a second state when the supply voltage is quiescent to provide a path for the supply current that bypasses the Buck-Boost converter.

14. A method comprising:
providing a Buck-Boost converter including an input node to receive a supply voltage and a supply current, an output node to be coupled to a load, the Buck-Boost converter including an inductor, capacitors including a load capacitor and a helper capacitor, and transistors to configure the Buck-Boost converter to perform:
when the supply voltage is turning ON, operating in a Buck mode to (a) in a first cycle, use the supply current to charge the capacitors in parallel and charge a magnetic field in the inductor, and (b) in a second cycle without using the supply current, discharge the inductor, and the capacitors in parallel, through the output node, to limit an inrush of supply current; and
when the supply voltage is turning OFF, operating in a Boost mode to (c) in a third cycle, cause the helper capacitor, but not the load capacitor, to charge the magnetic field, and (d) in a fourth cycle, discharge the inductor, and the capacitors, through the output node, to extend a voltage hold-up time at the output node.

15. The method of claim 14, wherein the Buck-Boost converter further includes the inductor and a diode connected in series from the input node to the output node, a first Boost transistor of the transistors connected to the inductor, and a second Boost transistor of the transistors connected to the helper capacitor and the inductor, and the operating in the Boost mode includes, during the third cycle of the Boost mode, providing that the first Boost transistor is ON and the second Boost transistor is ON to enable current to flow from the helper capacitor to the inductor to charge the magnetic field in the inductor, while the inductor is isolated from the output node by the diode.

16. The method of claim 15, wherein the operating in the Boost mode further includes, during the fourth cycle of the Boost mode, providing that the first Boost transistor is OFF and the second Boost transistor is ON, and the inductor supplies current to the output node through the diode while the load capacitor supplies current to the output node.

17. A system comprising:
a Buck-Boost converter including an input node to receive a supply voltage and a supply current, an output node to be coupled to a load, and transistors to configure the Buck-Boost converter in response to transistor control signals;
a relay, connected to the input node and the output node so as to be in parallel with the Buck-Boost converter, and configured to be responsive to a relay control signal; and
a controller to generate the transistor control signals and the relay control signal to:
when the supply voltage is turning ON, open the relay to force the supply current to flow into the Buck-Boost converter, and operate the Buck-Boost converter in a Buck mode to limit an inrush of the supply current; and
when the supply voltage is turning OFF, open the relay, and operate the Buck-Boost converter in a Boost mode to extend a voltage hold-up time at the output node.

18. The system of claim 17, wherein:
the controller is configured to, once the supply voltage has risen to a quiescent level after turning ON, generate the relay control signal to close the relay to bypass the Buck-Boost converter.

19. The system of claim 17, wherein:
the Buck-Boost converter further includes an inductor, and capacitors including a load capacitor and a helper capacitor; and
the Buck mode is configured to (a) in a first cycle, use the supply current to charge the capacitors in parallel and charge a magnetic field in the inductor, and (b) in a second cycle without using the supply current, discharge the inductor, and the capacitors in parallel, through the output node, to limit the inrush of the supply current.

20. The system of claim 17, wherein:
the Buck-Boost converter further includes an inductor, and capacitors including a load capacitor and a helper capacitor; and
the Boost mode is configured to (a) in a first cycle, cause the helper capacitor, but not the load capacitor, to charge a magnetic field of the inductor, and (b) in a second cycle, discharge the inductor, and the capacitors, through the output node, to extend the voltage hold-up time at the output node.

* * * * *